United States Patent
Liu et al.

(10) Patent No.: US 10,101,197 B2
(45) Date of Patent: Oct. 16, 2018

(54) VIBRATION COLLECTOR AND ELECTRONIC DEVICE

(71) Applicants: BEIJING LENOVO SOFTWARE LTD., Beijing (CN); LENOVO (BEIJING) LIMITED, Beijing (CN)

(72) Inventors: Junfeng Liu, Beijing (CN); Qicheng Ding, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 484 days.

(21) Appl. No.: 14/724,142

(22) Filed: May 28, 2015

(65) Prior Publication Data
US 2016/0187191 A1 Jun. 30, 2016

(30) Foreign Application Priority Data
Dec. 30, 2014 (CN) .......................... 2014 1 0850605

(51) Int. Cl.
*G01D 11/24* (2006.01)
*G01H 11/08* (2006.01)

(52) U.S. Cl.
CPC .............. *G01H 11/08* (2013.01); *G01D 11/24* (2013.01)

(58) Field of Classification Search
CPC ................................ G01D 11/24; G01H 11/08
USPC ........................................................... 73/658
See application file for complete search history.

(56) References Cited

U.S. PATENT DOCUMENTS

| | | | | |
|---|---|---|---|---|
| 4,612,620 A | * | 9/1986 | Davis | G01H 1/00 702/184 |
| 4,885,707 A | * | 12/1989 | Nichol | G01H 1/003 235/375 |
| 6,484,109 B1 | * | 11/2002 | Lofall | G01H 1/003 702/56 |
| 2004/0066302 A1 | * | 4/2004 | Menard | G08B 13/1436 340/669 |
| 2006/0018488 A1 | | 1/2006 | Viala et al. | |
| 2011/0070829 A1 | * | 3/2011 | Griffin | H04B 5/02 455/41.1 |
| 2012/0079915 A1 | * | 4/2012 | Choi | F03G 7/10 74/84 R |
| 2014/0161287 A1 | * | 6/2014 | Liu | H04R 17/02 381/151 |

(Continued)

FOREIGN PATENT DOCUMENTS

CN 1977161 A 6/2007
WO WO2014050348 * 4/2014 ............ G01M 3/243

*Primary Examiner* — J M Saint Surin
(74) *Attorney, Agent, or Firm* — Scully Scott Murphy & Presser

(57) ABSTRACT

The present disclosure provides a vibration collector. The vibration collector comprises: a vibration collecting component; a first wireless coupler connected to the vibration collecting component; and an attaching component that is made of a flexible material and enables the vibration collector to be fixed onto an outer surface of an object in a detachable manner. When the vibration collector is fixed onto the outer surface of the object, the vibration collecting component collects a vibration from a vibration source and generates an electrical vibration signal based on the vibration. The first wireless coupler transmits the electrical vibration signal to an electronic device for processing. Also provided is an electronic device.

16 Claims, 6 Drawing Sheets

(56) References Cited

U.S. PATENT DOCUMENTS

2015/0351292 A1* 12/2015 Chang .................... H01Q 1/526
    361/749
2015/0362893 A1* 12/2015 Masserot ................. G04G 5/00
    368/4

* cited by examiner

VIBRATION COLLECTOR AND ELECTRONIC DEVICE

TECHNICAL FIELD

The present disclosure relates to information collection technology, and more particularly, to a vibration collector and an electronic device.

BACKGROUND

With continuous development of science and technology, the electronic technology evolves rapidly. There are more and more types of electronic products and users have enjoyed various conveniences that come with such development of science and technology. Now, with various types of electronic devices, users are enjoying comfortable lives brought by the development of science and technology.

Currently, most of users collect their vibration parameters using wearable devices. First, a user needs to wear a device, such as a smart watch or a smart glass, in contact with his/her skin. Then, the user's vibration parameters can be obtained by vibration sensors provided on the device. However, if the user is running or swimming and is thus not convenient to wear a wearable device, it is impossible to collect his/her vibration parameters. On the other hand, in order to collect vibration parameters from an external vibration source, the user typically needs to connect a dedicated collector. In this case, the vibration collection is not flexible and inconvenient for operation.

SUMMARY

In view of this, it is an object of the present disclosure to provide a vibration collector and an electronic device, capable of enabling a user to collect vibrations in a flexible and convenient manner, thereby providing an improved user experience.

The above object is achieved by providing the following embodiments of the present disclosure.

In a first aspect, a vibration collector is provided. The vibration collector comprises: a vibration collecting component; a first wireless coupler connected to the vibration collecting component; and an attaching component that is made of a flexible material and enables the vibration collector to be fixed onto an outer surface of an object in a detachable manner. When the vibration collector is fixed onto the outer surface of the object, the vibration collecting component collects a vibration from a vibration source and generates an electrical vibration signal based on the vibration, and the first wireless coupler transmits the electrical vibration signal to an electronic device for processing.

In a second aspect, an electronic device is provided. The electronic device is communicative with the vibration collector according to the first aspect and comprises: a casing; a second wireless coupler enclosed within the casing; and an electrical vibration signal processing component enclosed within the casing and connected to the second wireless coupler. The second wireless coupler is configured to receive the electrical vibration signal from the vibration collector and forward it to the electrical vibration signal processing component for processing.

DETAILED DESCRIPTION OF THE EMBODIMENTS

In the following, the solutions according to the embodiments of the present disclosure will be described clearly and completely with reference to the figures.

Figure 1:
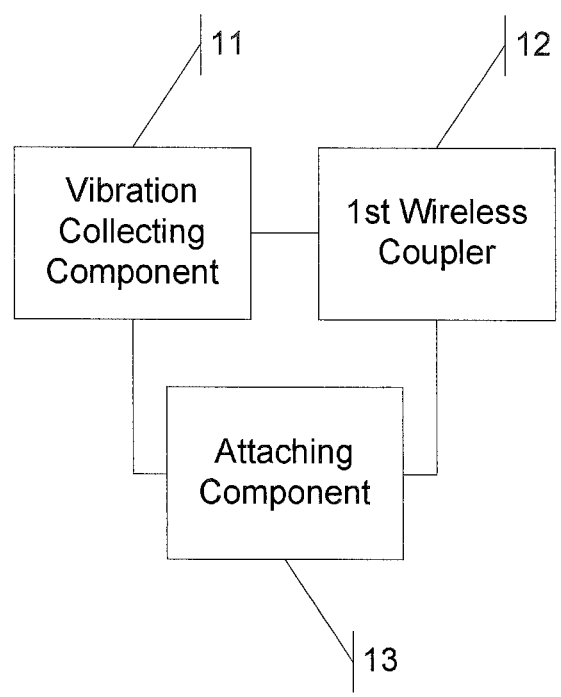
FIG. 1 is a functional block diagram of vibration collectors according to the first and second embodiments of the present disclosure.

According to an embodiment, a vibration collector is provided. As shown in FIG. 1, the vibration collector includes a vibration collecting component 11; a first wireless coupler 12 connected to the vibration collecting component 11; and an attaching component 13 that is made of a flexible material and enables the vibration collector to be fixed onto an outer surface of an object in a detachable manner.

Figure 2A:
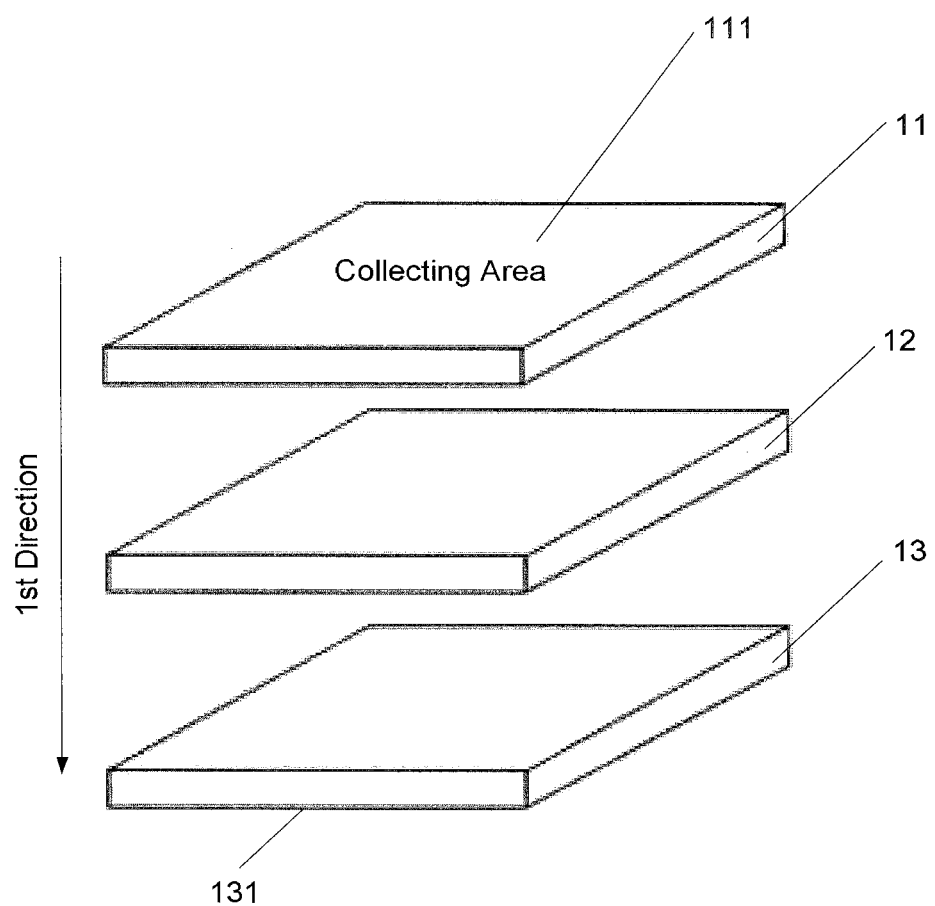
FIGS. 2A and 2B are schematic diagrams showing positional relations between a vibration collecting component and an attaching component according to the first and second embodiments of the present disclosure.

In particular, as shown in FIG. 2A, the vibration collector 11 has a collecting surface 111 that collects a vibration from a vibration source when it is in contact with the vibration source, and generates an electrical vibration signal. The attaching component 13 has an attaching surface 131 in contact with and attached to the outer surface of the object. When the vibration source is the object, the collecting surface 111 and the attaching surface 131 face the same direction. After the vibration collector has been fixed onto the outer surface of the object, the collecting surface 111 is sufficiently close to the outer surface of the object, or may even be in contact with the outer surface of the object. In this case, the vibration collecting component 11 collects the vibration from the object and generates an electrical vibration signal. Then, the first wireless coupler 13 transmits the electrical vibration signal to an electronic device for processing.

It is to be noted here that, in this embodiment, the attaching component 13 can be attached to the outer surface of the object to form an unclosed, curved surface, independently from any particular shape or structure of the above object. For example, the attaching component 13 can be adhered to the outer surface of the object, without any fixing arrangement such as a ring or a belt to fix it onto the outer surface of the object by wrapping, binding or bundling it to the object.

Further, the vibration collecting component 11 can be an audio collecting component. When the vibration collector is fixed onto the outer surface of the object, the audio collecting component is in contact with the outer surface of the object, collects a vibration from inside the object and generates the electrical vibration signal based on the vibration. In this case, the electrical vibration signal is a sound signal emitted from inside the object. After receiving the electrical vibration signal, i.e., the sound signal, the electronic device applies audio processing, e.g., audio encoding/ decoding, to the electrical vibration signal to obtain an audio signal. Further, the electronic device can further process the obtained audio signal in accordance with an application that is currently running.

For example, when a voice/video call application is currently running, the electronic device can instruct a coupler included therein to transmit, to a call party of the voice/video call, the audio signal obtained based on the electrical vibration signal from the vibration collector. As another example, when a video playing application is currently running, the electronic device can apply voice recognition to the electrical vibration signal from the vibration collector and obtain a control instruction for a video that is currently being played based on the recognition result.

In one or more of the above embodiments, the above audio collecting component can be a bone conductive microphone. In this case, with the attaching component 13, the vibration collector can be attached to somewhere on the neck, near the throat or on the face, near the nose. Since there is no need to provide in the electronic device a conventional microphone that collects sounds emitted from objects by virtue of air vibration, the space occupied by the electronic device can be reduced, while preventing the user's voice input to the electronic device from being known by others. Additionally, since the attaching component 13 forms an unclosed, curved surface when being attached to the skin surface on the neck, it will not constrict the user's organs as in the case of a neck ring or nose pads of glasses. In this way, the user will feel more comfortable when using the vibration collector.

Figure 3A:
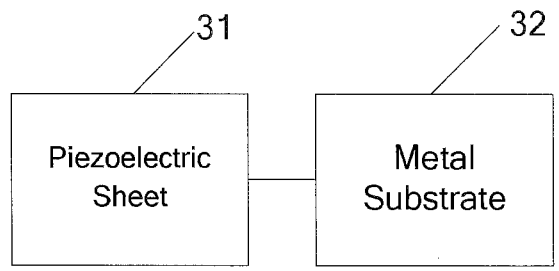
FIGS. 3A and 3B are schematic diagrams showing a structure of an audio collecting component according to the first and second embodiments of the present disclosure.

Then, in this embodiment, the audio collecting component can include a piezoelectric sheet 31 in contact with the outer surface of the object; and a metal substrate 32 provided within the vibration collector, as shown in FIG. 3A.

In particular, the piezoelectric sheet 31 can have a piezoelectric sheet surface connected to the metal substrate 32, such that the metal substrate 32 can support the piezoelectric sheet 31. Further, the piezoelectric sheet 31 can have a second piezoelectric sheet surface provided on a first surface inside the vibration collector, so as to be in contact with the object from which sounds are to be collected. The piezoelectric sheet 31 can be pre-polarized by the metal substrate 32 to create a saturated electric field inside the piezoelectric sheet. When the object in contact with the piezoelectric sheet 31 vibrates, the piezoelectric sheet 31 is deformed such that the charge distribution in the saturated electric field created in advance within the piezoelectric sheet 31 is changed, thereby generating the electrical vibration signal.

As noted above, the metal substrate 32 can be enclosed in the vibration collector together with the piezoelectric sheet 31 for supporting the piezoelectric sheet 31. Alternatively, after the piezoelectric sheet 31 has been pre-polarized by the metal substrate 32, the metal substrate 32 can be removed before the audio collecting component is enclosed in the vibration collector, so as to make the audio collecting component lighter and slimmer.

In practice, the audio collecting component can include only one piezoelectric sheet and its corresponding metal substrate. Of course, the audio collecting component can alternatively include two or more piezoelectric sheets and their respective corresponding metal substrates. In this case, the two or more piezoelectric sheets and their respective corresponding metal substrates can be arranged along the outer surface of the object, thereby increasing the sensitivity of vibration detection by the audio collecting component.

Figure 3B:
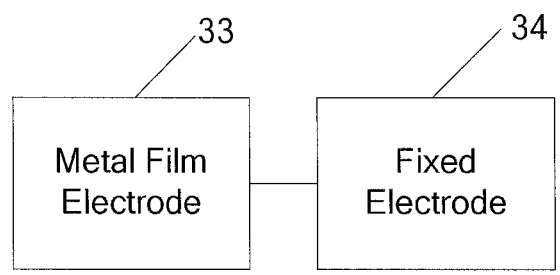

In another embodiment, the audio collecting component can include a metal film electrode 33 in contact with the outer surface of the object; and a fixed electrode 34 provided within the vibration collector and having a first voltage difference with respect to the metal film electrode 33, as shown in FIG. 3B.

In particular, the metal film electrode 33 can be provided on a first surface of the vibration collector and is deformable in response to the vibration generated by the object. The fixed electrode 34 is provided within the vibration collector. When the vibration collector is powered on, there is a first voltage difference between the metal film electrode 33 and the fixed electrode 34, such that the capacitance formed between the metal film electrode 33 and the fixed electrode 34 has a saturated quantity of charge when there is no vibrating object coming into contact with the metal film electrode. When an object in contact with the metal film electrode 33 vibrates and the metal film electrode 33 is deformed, the distance between the metal film electrode 33 and the fixed electrode 34 is changed, which in turn changes the charge distribution between the metal film electrode 33 and the fixed electrode 34, thereby generating the electrical vibration signal.

In practice, the audio collecting component can include only one metal film electrode and its corresponding fixed electrode. Of course, the audio collecting component can alternatively include two or more metal film electrodes and their respective corresponding fixed electrodes. In this case, the two or more metal film electrodes and their respective corresponding fixed electrodes can be arranged along the outer surface of the object, thereby increasing the sensitivity of vibration detection by the audio collecting component.

In this embodiment, the first wireless coupler 12 can be made of a flexible circuit board and can be a Near Field Communication (NFC) coil, a radio frequency antenna or a Bluetooth component, etc. The attaching component 13 can be made of an adhesive flexible material such as a double sided adhesive tape or an adhesive tape, such that the attaching surface 131 can be adhesive and can be adhered to the outer surface of the object. Of course, the attaching component 13 can be made of any other flexible material such as rubber or flexible magnet, as can be appreciated by those skilled in the art. The present disclosure is not limited to that. When the vibration collector is fixed to the object which has a curved outer surface, the attaching component 13 will be deformed to be against the outer surface of the object, so as to secure the vibration collector.

Figure 4:
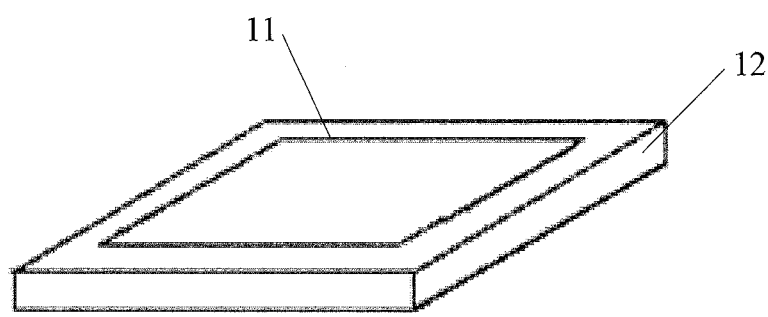
FIG. 4 is a schematic diagram showing a positional relation between a vibration collecting component and a first wireless coupler according to the first and second embodiments of the present disclosure.

Further, in order to reduce the thickness of the vibration collector and to make it lighter and slimmer, the first wireless coupler 12 can be co-planar with the vibration collecting component 11, as shown in FIG. 4. In this way, when the vibration collector is fixed onto the surface of the object, it will not affect the appearance of the surface of the object due to its small size. Also, since the vibration collecting component 11 is made of a flexible material, when it is co-planar with the first wireless coupler 12, which is also flexible, the overall deformability of the vibration collector will be improved.

Figure 5A:
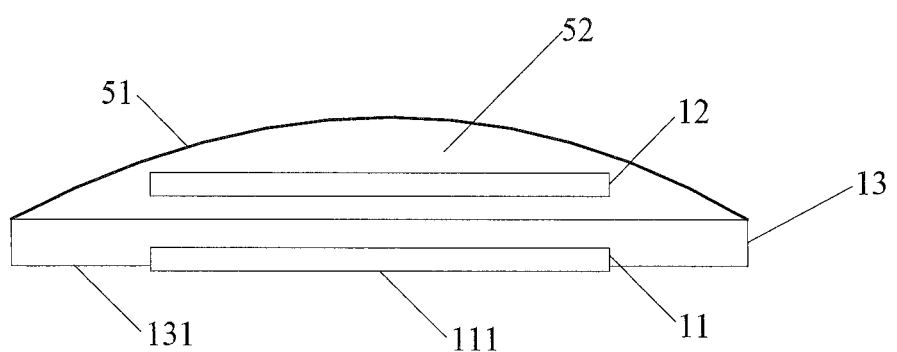
FIGS. 5A and 5B are schematic diagrams showing structures of vibration collectors according to the first and second embodiments of the present disclosure.

Optionally, as shown in FIG. 5A, in order to protect the vibration collecting component 11 and the first wireless coupler 12, a protecting component 51 can be provided at the position corresponding to the collecting area 111. The protecting component 51 is connected to the attaching component 13 to form a closed space 52. The vibration collecting component 11 and the first wireless coupler 12 are enclosed in the closed space 52 and exposed to the attaching component 13. The protecting component 51 can protect the vibration collecting component 11 and the first wireless coupler 12 from water, oil, chemical reagent, scratch, dust, strike, and the like.

The vibration collector needs to consume electric power while it is operating. In this embodiment, the vibration collector can receive electric power in any of the following three non-limiting ways.

First, the vibration collector can be equipped with its dedicated power supply device. In this case, the vibration collecting component can further include a cell connected to the vibration collecting component 11 and the first wireless coupler 12 for supplying power to them, so as to ensure the operability of the vibration collector.

In practice, the cell can be a common primary cell, such as a button cell or a sheet cell, or a rechargeable cell, such as Lithium cell, NiCd cell or thin-film solar rechargeable cell. The present disclosure is not limited to any of these cells.

When the cell runs out, it can be removed from the vibration collector and replaced with a new one. Alternatively, a rechargeable cell can be removed for recharging and, after that, it can be installed onto the vibration collector again.

Second, the vibration collector can be equipped with its dedicated power receiving device. In this case, the vibration collecting component can further include a wireless chargeable component for coupling electric power radiated from an external wireless power supply component for wireless charging and in turn supplying power to the vibration collecting component 11 and the first wireless coupler 12, so as to ensure the operability of the vibration collector.

In practice, the wireless chargeable component can be a wireless chargeable coil. When the vibration collector needs to be charged, the vibration collector can be placed on top of the external wireless power supply component for coupling electric power radiated from the wireless power supply component for wireless charging.

Third, the vibration collector does not have any built-in charge storage device. Instead, when the first wireless coupler 12 is communicating with the electronic device, it is reused to obtain electric power from the electronic device.

In order for the vibration collector to operate, the first wireless coupler 12 is brought into proximity of the electronic device to couple the electric signal radiated from the electronic device, such that the first wireless coupler 12 can be charged while performing data communication with the electronic device.

Of course, the vibration collector can obtain electric power in other ways, as long as the operability of the vibration collector can be ensured. The present disclosure is not limited to that.

It is to be noted here that the above cell and wireless chargeable coil can be made of rigid or flexible material. The present disclosure is not limited to that.

In the following, the operations of the vibration collector according to this embodiment will be explained with reference to an example.

It is assumed here that the vibration collecting component is a bone conductive microphone, the first wireless coupler is an NFC coil and the electronic device is a smart phone.

First, the user can use the attaching component to fix, e.g., by adhering, the vibration collector to somewhere on his/her neck, near his/her throat. In this case, the collecting surface of the bone conductive microphone comes in contact with the user's skin. Then, the user starts to speak and accordingly the surface of his/her skin vibrates to deform the collecting surface of the bone conductive microphone. The bone conductive microphone generates an electrical vibration signal in response to its own deformation, and transmits it to the NFC coil. The NFC coil is coupled to an NFC coupler in the smart phone and transmits the signal to the smart phone, which then extracts voice print information from the signal and performs a voice print recognition for the user.

It can be seen from above that, when the vibration collector is fixed onto the outer surface of the object, the vibration collecting component collects the vibration from the vibration source and then generates the electrical vibration signal based on the vibration. The first wireless coupler transmits the electrical vibration signal to the electronic device for processing, thereby achieving functions associated with the signal. In this way, a novel vibration collector can be provided, which enables the user to collect the vibration in a flexible and convenient manner, thereby providing an improved user experience.

Second Embodiment

Based on the same inventive concept, according to this embodiment, a vibration collector is provided. As shown in FIG. 1, the vibration collector includes a vibration collecting component 11; a first wireless coupler 12 connected to the vibration collecting component 11; and an attaching component 13 that is made of a flexible material and enables the vibration collector to be fixed onto an outer surface of an object in a detachable manner.

Figure 2B:
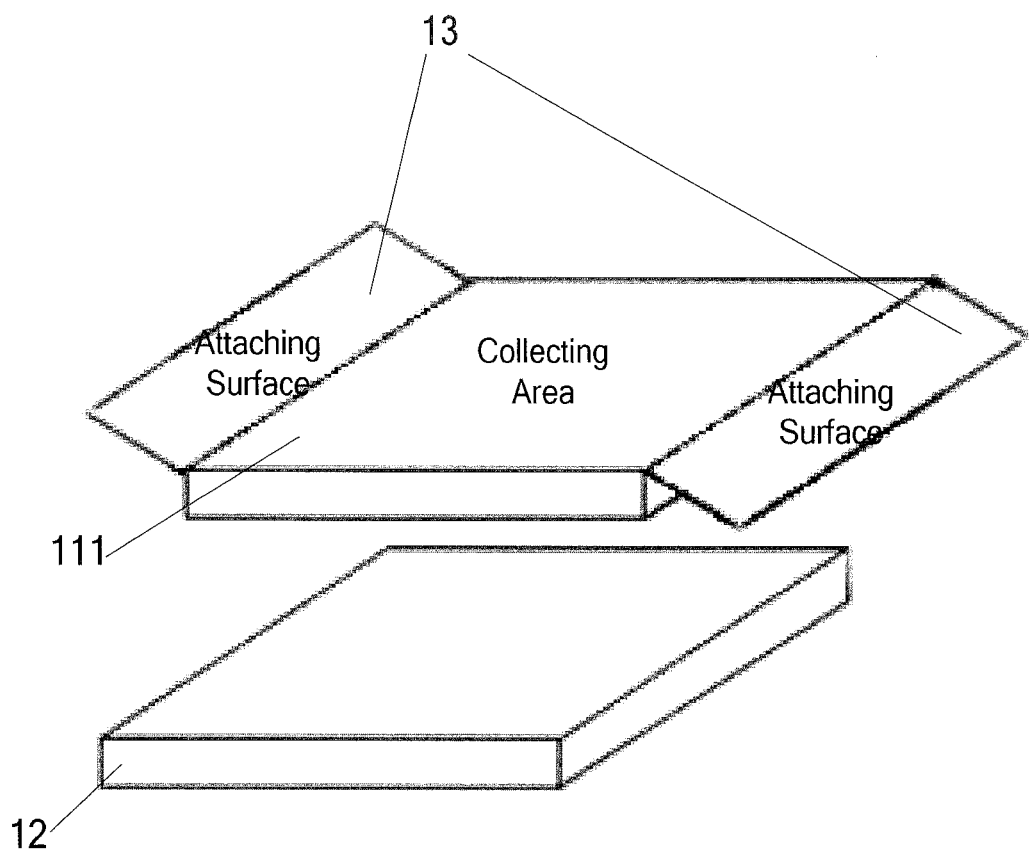

In particular, as shown in FIG. 2B, the vibration collector 11 has a collecting surface 111 that collects a vibration from a vibration source when it is in contact with the vibration source, and generates an electrical vibration signal. The attaching component 13 has an attaching surface 131 in contact with and attached to the outer surface of the object. When the vibration source is different from the object, the collecting surface 111 and the attaching surface 131 face opposite directions.

When the vibration collector is fixed onto the outer surface of the object, the collecting surface 111 is farther from the outer surface of the object when compared with the attaching surface 131 and is close to the vibration source or may even be in contact with the vibration source. In this case, the vibration collecting component 11 collects the vibration from the vibration source and generates an electrical vibration signal. Then, the first wireless coupler transmits the electrical vibration signal to an electronic device for processing.

It is to be noted here that, in this embodiment, the attaching component 13 can be attached to the outer surface of the object to form an unclosed, curved surface, independently from any particular shape or structure of the above object. For example, the attaching component can be adhered to the outer surface of the object, without any fixing arrangement such as a ring or a belt to fix it onto the outer surface of the object by wrapping, binding or bundling it to the object.

Further, the vibration collecting component 11 can be a vibration sensor. When the vibration collector is fixed onto the outer surface of the object, the vibration sensor comes in contact with the vibration source, collects the vibration from the vibration source, and generates an electrical vibration signal based on the vibration. In this case, the electrical vibration signal can be used as a control signal for controlling the electronic device. Then, upon receiving the electrical vibration signal, the electronic device can generate a corresponding control instruction for controlling the electronic device to power on/off, lock/unlock the screen and the like. Of course, in practice the vibration collecting component 11 can be any of other vibration collecting components. The present disclosure is not limited to this.

In this embodiment, the first wireless coupler 12 can be made of a flexible circuit board and can be a Near Field Communication (NFC) coil, a radio frequency antenna or a Bluetooth component, etc. The attaching component 13 can be made of an adhesive flexible material such as a double sided adhesive tape or an adhesive tape, such that the attaching surface 131 can be adhesive and can be adhered to the outer surface of the object. Of course, the attaching component 13 can be made of any other flexible material such as rubber or flexible magnet, as can be appreciated by those skilled in the art. The present disclosure is not limited to that. When the vibration collector is fixed to the object which has a curved outer surface, the attaching component 13 will be deformed to be against the outer surface of the object, so as to secure the vibration collector.

Further, in order to reduce the thickness of the vibration collector and to make it lighter and slimmer, the first wireless coupler 12 can be co-planar with the vibration collecting component 11, as shown in FIG. 4. In this way, when the vibration collector is fixed onto the surface of the object, it will not affect the appearance of the surface of the object due to its small size. Also, since the vibration collecting component 11 is made of a flexible material, when it is co-planar with the first wireless coupler 12, which is also flexible, the overall deformability of the vibration collector will be improved.

Figure 5B:
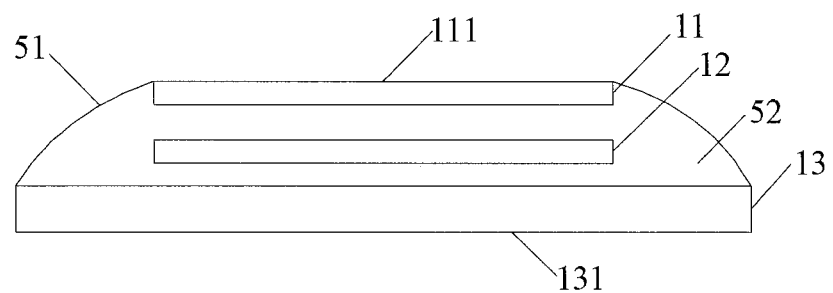

Optionally, as shown in FIG. 5B, in order to protect the vibration collecting component 11 and the first wireless coupler 12, a protecting component 51 can be provided at the position corresponding to the collecting area 111. The protecting component 51 is connected to the attaching component 13 to form a closed space 52. The vibration collecting component 11 and the first wireless coupler 12 are enclosed in the closed space 52 and exposed to the attaching component 13. The protecting component 51 can protect the vibration collecting component 11 and the first wireless coupler 12 from water, oil, chemical reagent, scratch, dust, strike, and the like, without affecting the vibration collecting component 11 to collect the vibration generated by the vibration source.

The vibration collector needs to consume electric power while it is operating. In this embodiment, the vibration collector can receive electric power in any of the following three non-limiting ways.

First, the vibration collector can be equipped with its dedicated power supply device. In this case, the vibration collector can further include a cell connected to the vibration collecting component 11 and the first wireless coupler 12 for supplying power to them, so as to ensure the operability of the vibration collector.

In practice, the cell can be a common primary cell, such as a button cell or a sheet cell, or a rechargeable cell, such as Lithium cell, NiCd cell or thin-film solar rechargeable cell. The present disclosure is not limited to any of these cells.

When the cell runs out, it can be removed from the vibration collector and replaced with a new one. Alternatively, a rechargeable cell can be removed for recharging and, after that, it can be installed onto the vibration collector again.

Second, the vibration collector can be equipped with its dedicated power receiving device. In this case, the vibration collector can further include a wireless chargeable component for coupling electric power radiated from an external wireless power supply component for wireless charging and in turn supplying power to the vibration collecting component 11 and the first wireless coupler 12, so as to ensure the operability of the vibration collector.

In practice, the wireless chargeable component can be a wireless chargeable coil. When the vibration collector needs to be charged, the vibration collector can be placed on top of the external wireless power supply component for coupling electric power radiated from the wireless power supply component for wireless charging.

Third, the vibration collector does not have any built-in charge storage device. Instead, when the first wireless coupler 12 is communicating with the electronic device, it is reused to obtain electric power from the electronic device.

In order for the vibration collector to operate, the first wireless coupler 12 is brought into proximity of the electronic device to couple the electric signal radiated from the electronic device, such that the first wireless coupler 12 can be charged while performing data communication with the electronic device.

Of course, the vibration collector can obtain electric power in other ways, as long as the operability of the vibration collector can be ensured. The present disclosure is not limited to that.

It is to be noted here that the above cell and wireless chargeable coil can be made of rigid or flexible material. The present disclosure is not limited to that.

In the following, the operations of the vibration collector according to this embodiment will be explained by way of an example.

It is assumed here that the vibration collecting component is a vibration sensor, the first wireless coupler is a Bluetooth component and the electronic device is a notebook computer.

First, the user can use the attaching component to fix, e.g., by adhering or magnetically attaching, the vibration collector to a foot of the notebook computer and place the notebook computer on a table. In this case, the collecting surface of the vibration sensor comes in contact with the table. Then, the user starts to knock the table and accordingly the table vibrates to cause the vibration sensor to generate an electrical vibration signal and transmit it to the Bluetooth component. The Bluetooth component is paired with a Bluetooth component in the notebook computer and transmits the signal to the note book computer, which then generates a power off instruction based on the electrical signal and executes the power off instruction to power off itself.

It can be seen from above that, when the vibration collector is fixed onto the outer surface of the object, the vibration collecting component collects the vibration from the vibration source and then generates the electrical vibration signal based on the collected vibration. The first wireless coupler transmits the electrical vibration signal to the electronic device for processing, thereby achieving functions associated with the signal. In this way, a novel vibration collector can be provided, which enables the user to collect the vibration in a flexible and convenient manner, thereby providing an improved user experience.

Third Embodiment

Based on the same inventive concept, according to this embodiment, an electronic device is provided. The electronic device can be a smart phone or a tablet computer and is capable of communicating with the vibration collector according to one or more of the above embodiments.

Figure 6:
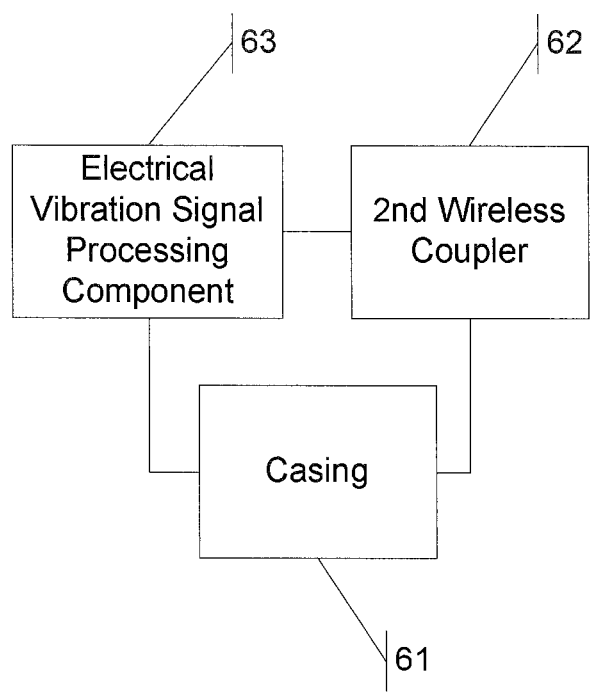
FIG. 6 is a functional block diagram of an electronic device according to the third embodiment of the present disclosure.

As shown in FIG. 6, the electronic device includes: a casing 61; a second wireless coupler 62 enclosed within the casing 61; and an electrical vibration signal processing component 63 enclosed within the casing 61 and connected to the second wireless coupler 62. The second wireless coupler 62 is configured to receive the electrical vibration signal from the vibration collector and forward it to the electrical vibration signal processing component 63 for processing.

In particular, when the vibration collecting component is an audio collecting component, the second wireless coupler 62 receives the electrical vibration signal and the electrical vibration signal processing component 63 applies audio processing, e.g., audio encoding/decoding, to the electrical vibration signal to obtain an audio signal. Further, the electrical vibration signal processing component 63 can further process the obtained audio signal in accordance with an application that is currently running.

For example, when a voice/video call application is currently running, the electrical vibration signal processing component 63 can instruct a coupler included therein to transmit, to a call party of the voice/video call, the audio signal obtained based on the electrical vibration signal from the vibration collector. As another example, when a video playing application is currently running, the electrical vibration signal processing component 63 can apply voice recognition to the electrical vibration signal from the vibration collector and obtain a control instruction for a video that is currently being played based on the recognition result. In addition, the electronic device may further include a storage component for storing the audio signal that has been subject to audio processing by the electrical vibration signal processing component 63.

In practice, the second wireless coupler 62 is paired with the first wireless coupler in the vibration collector and can be e.g., an NFC coil, a radio frequency antenna or a Bluetooth component, etc. The electrical vibration signal processing component 63 can be a processor such as CPU, ARM or DSP, or a single-chip machine or a system chip. The present disclosure is not limited to this.

In addition to communicating with the first wireless coupler, the second wireless coupler 62 is further configured to radiate electric power to the vibration collector, such that the first wireless coupler can couple the electric power to supply power to the vibration collector.

The electronic device may further include: a wireless power supply component for radiating electric power to the vibration collector, such that the first wireless coupler can couple the electric power for wireless charging, so as to supply power to the vibration collector.

While the preferred embodiments of the present disclosure have been described above, various modifications and alternatives to these embodiments can be made by those skilled in the art based on the fundamental inventive concept. Therefore, these preferred embodiments and all the modifications and alternatives falling within the scope of the present disclosure are to be encompassed by the claims as attached.

Obviously, various modifications and alternatives can be made to the present disclosure by those skilled in the art without departing from the spirit and scope of the present disclosure. Therefore, these modifications and alternatives are to be encompassed by the present disclosure if they fall within the scope of the claims and their equivalents.

What is claimed is:
1. A vibration collector, comprising:
   a vibration collecting component;
   a first wireless coupler connected to the vibration collecting component; and
   an attaching component that is made of a flexible material and enables the vibration collector to be fixed onto an outer surface of an object in a detachable manner;
   wherein, a collecting surface of the vibration collecting component and an attaching surface of the attaching component face opposite directions, and when the vibration collector is fixed onto the outer surface of the object, the vibration collecting component collects a vibration from a vibration source different from the object and generates an electrical vibration signal based on the vibration, and the first wireless coupler transmits the electrical vibration signal to an electronic device for processing.

2. A vibration collector comprising:
   a vibration collecting component;
   a first wireless coupler connected to the vibration collecting component; and
   an attaching component that is made of a flexible material and enables the vibration collector to be fixed onto an outer surface of an object in a detachable manner;
   wherein a collecting surface of the vibration collecting component and an attaching surface of the attaching component
   face a same direction, and when the vibration collector is fixed onto the outer surface of the object, the vibration collecting component collects a vibration from the object and generates an electrical vibration signal based on the vibration, and the first wireless coupler transmits the electrical vibration signal to an electronic device for processing.

3. The vibration collector of claim 1, wherein the vibration collecting component is an audio collecting component in contact with the outer surface of the object, the audio collecting component is configured to collect a vibration from a vibration source inside the object and generate the electrical vibration signal based on the vibration.

4. The vibration collector of claim 3, wherein the audio collecting component comprises:
   a piezoelectric sheet in contact with the outer surface of the object; and
   a metal substrate provided within the vibration collector,
   wherein the piezoelectric sheet is pre-polarized by the metal substrate to create a saturated electric field inside the piezoelectric sheet, and when the object in contact with the piezoelectric sheet vibrates, the piezoelectric sheet is deformed and the electrical vibration signal is generated by the electric field inside the piezoelectric sheet.

5. The vibration collector of claim 3, wherein the audio collecting component comprises:
   a metal film electrode in contact with the outer surface of the object; and
   a fixed electrode provided within the vibration collector and having a first voltage difference with respect to the metal film electrode,
   wherein, when the object in contact with the metal film electrode vibrates, the metal film electrode is deformed, such that a charge distribution between the metal film electrode and the fixed electrode is changed, thereby generating the electrical vibration signal.

6. The vibration collector of claim 1, wherein the vibration collecting component and/or the first wireless coupler is/are made of a flexible material and the vibration collector is deformable as a whole, so as to be attached to the outer surface of the object closely.

7. The vibration collector of claim 1, wherein
the vibration collecting component further comprises a cell for supplying power to the vibration collector, or
the first wireless coupler further couples electric power emitted from the electronic device to supply power to the vibration collector.

8. An electronic device communicative with a vibration collector,
wherein the vibration collector comprises:
a vibration collecting component;
a first wireless coupler connected to the vibration collecting component; and
an attaching component that is made of a flexible material and enables the vibration collector to be fixed onto an outer surface of an object in a detachable manner,
wherein when the vibration collector is fixed onto the outer surface of the object, the vibration collecting component collects a vibration from a vibration source and generates an electrical vibration signal based on the vibration, and the first wireless coupler transmits the electrical vibration signal to an electronic device for processing, and
wherein a collecting surface of the vibration collecting component and an attaching surface of the attaching component face opposite directions, the vibration collecting component collects a vibration from a vibration source different from the object, or the collecting surface of the vibration collecting component and the attaching surface of the attaching component face a same direction, the vibration collecting component collects a vibration from the object;
the electronic device comprising:
a casing;
a second wireless coupler enclosed within the casing; and
an electrical vibration signal processing component enclosed within the casing and connected to the second wireless coupler,
wherein the second wireless coupler is configured to receive an electrical vibration signal from the vibration collector and forward it to the electrical vibration signal processing component for processing.

9. The electronic device of claim 8, wherein the second wireless coupler is further configured to radiate electric power to the vibration collector, such that the first wireless coupler can couple the electric power to supply power to the vibration collector.

10. The electronic device of claim 8, further comprising: a wireless power supply component for radiating electric power to the vibration collector, such that the first wireless coupler can couple the electric power for wireless charging, so as to supply power to the vibration collector.

11. A system, comprising:
a vibration collector; and
an electronic device communicative with the vibration collector,
wherein the vibration collector comprises:
a vibration collecting component;
a first wireless coupler connected to the vibration collecting component; and
an attaching component that is made of a flexible material and enables the vibration collector to be fixed onto an outer surface of an object in a detachable manner,
wherein when the vibration collector is fixed onto the outer surface of the object, the vibration collecting component collects a vibration from a vibration source and generates an electrical vibration signal based on the vibration, and the first wireless coupler transmits the electrical vibration signal to an electronic device for processing, and
wherein a collecting surface of the vibration collecting component and an attaching surface of the attaching component face opposite directions, and when the vibration collector is fixed onto the outer surface of the object, the vibration collecting component collects a vibration from a vibration source different from the object and generates the electrical vibration signal, or the collecting surface of the vibration collecting component and the attaching surface of the attaching component face a same direction, and when the vibration collector is fixed onto the outer surface of the object, the vibration collecting component collects a vibration from the object and generates the electrical vibration signal; and
wherein the electronic device comprising:
a casing;
a second wireless coupler enclosed within the casing; and
an electrical vibration signal processing component enclosed within the casing and connected to the second wireless coupler,
wherein the second wireless coupler is configured to receive an electrical vibration signal from the vibration collector and forward it to the electrical vibration signal processing component for processing.

12. The vibration collector of claim 2, wherein the vibration collecting component is an audio collecting component in contact with the outer surface of the object, the audio collecting component is configured to collect a vibration from a vibration source inside the object and generate the electrical vibration signal based on the vibration.

13. The vibration collector of claim 12, wherein the audio collecting component comprises:
a piezoelectric sheet in contact with the outer surface of the object; and
a metal substrate provided within the vibration collector, wherein the piezoelectric sheet is pre-polarized by the metal substrate to create a saturated electric field inside the piezoelectric sheet, and when the object in contact with the piezoelectric sheet vibrates, the piezoelectric sheet is deformed and the electrical vibration signal is generated by the electric field inside the piezoelectric sheet.

14. The vibration collector of claim 12, wherein the audio collecting component comprises:
a metal film electrode in contact with the outer surface of the object; and
a fixed electrode provided within the vibration collector and having a first voltage difference with respect to the metal film electrode,
wherein, when the object in contact with the metal film electrode vibrates, the metal film electrode is deformed, such that a charge distribution between the metal film electrode and the fixed electrode is changed, thereby generating the electrical vibration signal.

15. The vibration collector of claim 2, wherein the vibration collecting component and/or the first wireless coupler is/are made of a flexible material and the vibration collector is deformable as a whole, so as to be attached to the outer surface of the object closely.

16. The vibration collector of claim 2, wherein
the vibration collecting component further comprises a cell for supplying power to the vibration collector, or
the first wireless coupler further couples electric power emitted from the electronic device to supply power to the vibration collector.

* * * * *